(12) United States Patent
Wu et al.

(10) Patent No.: US 8,576,825 B2
(45) Date of Patent: Nov. 5, 2013

(54) METHOD AND SYSTEM FOR SENSING AVAILABLE SPECTRUM IN WIRELESS COMMUNICATION SYSTEMS

(75) Inventors: Shiquan Wu, Nepean (CA); Jung Yee, Ottawa (CA)

(73) Assignee: Wi-Lan, Inc., Ottawa (CA)

( * ) Notice: Subject to any disclaimer, the term of this patent is extended or adjusted under 35 U.S.C. 154(b) by 327 days.

(21) Appl. No.: 12/692,471

(22) Filed: Jan. 22, 2010

(65) Prior Publication Data

US 2010/0182928 A1    Jul. 22, 2010

Related U.S. Application Data

(60) Provisional application No. 61/146,495, filed on Jan. 22, 2009.

(51) Int. Cl.
 *H04J 1/00* (2006.01)
(52) U.S. Cl.
 USPC ........... 370/343; 375/135; 375/136; 375/146; 375/147; 370/344
(58) Field of Classification Search
 USPC ........... 370/319, 343, 344, 480; 375/130–153
 See application file for complete search history.

(56) References Cited

U.S. PATENT DOCUMENTS

| | | | | |
|---|---|---|---|---|
| 4,845,562 A | * | 7/1989 | Koslov et al. | 386/232 |
| 4,953,069 A | * | 8/1990 | Braun et al. | 363/41 |
| 7,349,469 B1 | * | 3/2008 | Touzni et al. | 375/232 |
| 2008/0112359 A1 | * | 5/2008 | Cleveland et al. | 370/329 |
| 2008/0181337 A1 | * | 7/2008 | Maxim | 375/340 |
| 2009/0252048 A1 | | 10/2009 | Liang et al. | |
| 2010/0091701 A1 | * | 4/2010 | Youn et al. | 370/328 |

FOREIGN PATENT DOCUMENTS

| | | |
|---|---|---|
| CN | 101213763 A | 7/2008 |
| WO | 2007043827 A1 | 4/2007 |
| WO | WO 2007043827 A1 * | 4/2007 |
| WO | W02007053125 | 5/2007 |
| WO | W02007056076 | 5/2007 |
| WO | 2008/032999 A2 | 3/2008 |

OTHER PUBLICATIONS

International Search Report and Written Opinion issued on Mar. 24, 2010, in corresponding application No. PCT/CA2010/000099, 9 pages.
Federal Communications Commission Second Report and Order and Memorandum Opinion and Order, Adopted Nov. 4, 2008, Released Nov. 14, 2008, FCC 08-260, 130 pages.

(Continued)

*Primary Examiner* — Mark Rinehart
*Assistant Examiner* — Mang Yeung
(74) *Attorney, Agent, or Firm* — Procopio, Cory, Hargreaves & Savitch LLP

(57) ABSTRACT

Managing RF spectrum usage by secondary, or unlicensed, devices in portions of the RF spectrum where licensed, or primary, services operate is a requirement of cognitive radio systems. To perform the necessary spectrum scanning, a transition period, such as a TTG or RTG can be extended and the scanning performed during the extended period. The presence of a primary service signal can also detected by detecting an energy signature of the primary service signal in a known sequence. In both cases, there is no need to define quiet periods during which secondary devices scan the RF spectrum, thus resulting in saving of resources and improved QoS.

6 Claims, 7 Drawing Sheets

(56) References Cited

OTHER PUBLICATIONS

Advanced Television Systems Committee, "ATSC Digital Television Standard Part 1—Digital Television System (A/53, Part 1:2007)," Doc. A/53, Part 1, Jan. 3, 2007, 22 pages.

Advanced Television Systems Committee, "ATSC Digital Television Standard Part 2—RF/Transmission System Characteristics (A/53, Part 2:2007)," Doc. A/53, Part 2, Jan. 3, 2007, 44 pages.

Advanced Television Systems Committee, "ATSC Digital Television Standard Part 3—Service Multiplex and Transport Subsystem Characteristics (A/53, Part 3:2007)," Doc. A/53, Part 3, Jan. 3, 2007, 27 pages.

Advanced Television Systems Committee, "ATSC Digital Television Standard Part 4—MPEG-2 Video System Characteristics (A/53, Part 4:2007, with Amendment No. 1)," Doc. A/53, Part 4, Jan. 3, 2007, modified Sep. 28, 2007, Amendment No. 1 dated Dec. 24, 2007, 29 pages.

Advanced Television Systems Committee, "ATSC Digital Television Standard Part 5—AC-3 Audio System Characteristics (A/53, Part 5:2007)," Doc. A/53, Part 5, Jan. 3, 2007, 14 pages.

Advanced Television Systems Committee, "ATSC Digital Television Standard Part 6—Enhanced AC-3 Audio System Characteristics (A/53, Part 6:2007)," Doc. A/53, Part 6, Jan. 3, 2007, 9 pages.

Advanced Television Systems Committee, "ATSC Digital Television Standard (A/53) Revision E, with Amendment No. 1," Doc. A/53E, Dec. 27, 2005, Amendment No. 1 dated Apr. 18, 2006, 125 pages.

Advanced Television Systems Committee, "Recommended Practice: Guide to the Use of the ATSC Digital Television Standard, including Corrigendum No. 1," Doc. A/54A, Dec. 4, 2003, Corrigendum No. 1 dated Dec. 20, 2006, 110 pages.

IEEE 802.22 Working Group of the Lan/Man Standards Committee, "IEEE P802.22/Draftv2.0 Draft Standard for Wireless Regional Area Networks Part 22: Cognitive Wireless RAN Medium Access Control (MAC) and Physical Layer (PHY) specifications: Policies and procedures for operation in the TV Bands," IEEE P802.22/D2.08, May 2009, 516 pages.

Liang et al. "Cognitive Radio on TV Bands: A New Approach to Provide Wireless Connectivity for Rural Areas." IEEE Wireless Communications, Jun. 2008. pp. 16-22.

Wright. "Dynamic Spectrum Access in the IEEE 802.22 Wireless Regional Area Network." IEEE Second International Conference on Access Networks & Workshops. Aug. 1, 2007. pp. 1-6.

Extended European Search Report for related EP 10733181.1 dated Mar. 7, 2013, 6 pages.

Office Action and Search Report dated Jul. 26, 2013 (together with English translation) for related CN Patent Application No. 201080003587.1, in 10 pages.

* cited by examiner

| STS-0 | STS-1 | .... | STS-9 | LTS-0 | .... | LTS-n | Data |

METHOD AND SYSTEM FOR SENSING AVAILABLE SPECTRUM IN WIRELESS COMMUNICATION SYSTEMS

CROSS-REFERENCE TO RELATED APPLICATIONS

The present application claims the benefit of U.S. Application No. 61/146,495, filed Jan. 22, 2009, the contents of which are incorporated herein by reference in their entirety.

FIELD OF THE INVENTION

This invention relates to wireless networks, and, in particular, to a method and system for sensing and managing the radio frequency (RF) spectrum available for wireless communications.

BACKGROUND

In a wireless environment, devices must share the RF spectrum while operating at an acceptable level of performance. As the number of wireless applications continues to grow, so does the numbers of devices, networks and systems contending for the communications spectrum, making the management of the RF spectrum an important issue.

Use of the RF spectrum is regulated by governmental entities in most countries. Currently, there are dedicated or licensed portions as well as unlicensed portions of the communications spectrum. Certain bands of the spectrum may be overloaded, such as cellular network bands, while other bands may be underused, such as television and radio broadcast bands. Because the unlicensed bands of the spectrum may be accessed freely, these bands tend to be heavily used. In contrast, only a small portion of the licensed bands is being used. Moreover, a specific television (TV) market may have only a few TV stations, leaving the rest of the licensed spectrum unused, or a radio or TV station may cease broadcasting at certain times of day.

The underuse of the licensed spectrum, together with the evolution of TV broadcasting from analog to digital, has lead regulatory bodies in some countries to open up some bands of the RF spectrum to secondary (unlicensed) users, provided such secondary users avoid interference with primary (licensed) users. As each TV station operating in a given market uses only a limited number of channels within the dedicated TV band, some digital channels remain unused in the respective area: this locally available spectrum is called "white space". Devices that use white space for wireless communication are often referred to as cognitive radios (CRs), secondary user systems, or white space devices. White space devices are required to identify free, or unused, channels in the licensed spectrum, and/or identify channels that are occupied by a primary user. If a primary user service is identified, the secondary user is required to seek other channel(s) or delay its use of the channel(s) until the primary user ceases to communicate.

In the United States, Federal Communications Commission (FCC) order FCC 08-260 specifies that devices operating in the TV band must not interfere with incumbent services such as TV broadcasts and wireless microphones. This order requires that signals radiated by any secondary devices or equipment operating in the Advanced Television Systems Committee (ATSC) spectrum must follow the FCC regulations so that the quality of the primary TV service will not be degraded by the signals present in nearby channels. Therefore white space devices need to be equipped with spectrum usage and management capabilities in order to meet the FCC's requirements.

To mitigate the interference between the increasing number of wireless devices vying for use of the spectrum, a variety of detection and avoidance schemes have been developed. However, the solutions currently proposed for spectrum management by cognitive radio systems result in implementation complexity by increasing the complexity of the systems, and in spectrum waste due to the cognitive radios using less than the full bandwidth available in the RF band.

Some techniques for detecting activity of wireless devices in a portion of interest of the radio spectrum include the use of quiet periods provided specifically for sensing the spectrum. During a quiet period, one or more wireless devices sharing a channel or a cell, refrain from transmitting and use the quiet period to detect other wireless devices, if any, that which they might interfere. This technique is proposed in the IEEE 802.22 draft standard for Wireless Regional Area Networks (WRANs). However, use of quiet period synchronization results in resource wastage and reduced quality of service (QoS), and current proposals do not permit the quiet period to be shortened when further detection or sensing is unnecessary.

According to another technique for detecting activity in the RF spectrum, the devices operating in a cell may employ channel-hopping or Dynamic Frequency Hopping (DFH): using a subset of the available channels in a band and, hopping to a different subset at regular intervals, after checking that the new subset is not already in use. In this way, the secondary users avoid hopping onto channels already in use by a primary user and, within a predetermined period, hop off of channels that a primary user has begun using. Such hopping techniques may also be used among sub-carriers within a single channel.

Another option for reallocation of the communications band involves the use of wireless networks adapted to dynamically access the communications spectrum. For example, dynamic spectrum access (DSA) wireless networks may be implemented in the licensed portions of the communications spectrum.

There is therefore a need for a more efficient technique of sensing the spectrum occupancy and managing the free spectrum in both time and frequency.

SUMMARY

In an embodiment, the invention provides a method for RF spectrum scanning in wireless communications. The method comprises sensing a signal, such as an Orthogonal Frequency Division Multiple Access (OFDMA) signal; identifying a pre-defined transition period in the signal, such as a transmit/receive transition gap or a receive/transmit transition gap (RTG); deriving an extended transition period; and scanning a portion of the RF spectrum during the extended transition period. If the presence of a primary service transmitting in the scanned portion is identified, the presence can be reported. Similarly, if a free channel in the scanned portion of the RF spectrum is identified, its existence can be reported. The extended transition period can be derived by programmably extending the pre-defined transition period, or by extending it in accordance with instructions in a received message, such as by a pre-specified amount of time.

In a further embodiment, the invention provides a method for RF spectrum scanning for wireless communications. The method comprises sensing a signal transmitted in a channel defined within the RF spectrum; identifying a portion of the signal containing a known sequence; and determining presence of a primary service on the channel by detecting energy from a primary service signal within the known sequence. The method can also comprise reporting the presence of the primary service on the channel. According to an embodiment, the presence of the primary service on the channel is determined by estimating multipath distortion in the signal; reconstructing a reconstructed sequence by applying the estimated multipath to the known sequence; determining the difference between the reconstructed sequence and the identified portion of the signal containing the known sequence; and determining that energy indicative of the primary service signal is present in the difference.

The methods can be implemented in a processor-based wireless communication device, including mobile wireless devices, base station, base transceiver stations, and access points that are intended for operation in a portion of the RF spectrum shared with licensed, or primary, services.

DESCRIPTION OF THE INVENTION

The present invention can be used to manage RF spectrum usage by secondary, or unlicensed, devices in portions of the RF spectrum where licensed, or primary, services operate. A method by which scanning is performed in an extended transition period is described, as is a method to sense the presence of primary service signals by detecting an energy signature of the primary service signal in a known sequence. In both cases, there is no need to define quiet periods during which secondary devices scan the RF spectrum, thus resulting in saving of resources and improved QoS. A spectrum sensor, also called a "sniffer", is used for to identify the channels available to the secondary devices. The spectrum sensor can be provided on each secondary device; alternatively, the base station may be equipped with such a sensor. Embodiments of the invention are described with reference to the proposed IEEE 802.22 WRAN standard, but the embodiments are not specifically not limited thereto, and may, for example, be used in other applications that require spectrum sensing capabilities, such as networks operating under IEEE 802.11, 802.15 and 802.16 standards.

The term "wireless devices" or "devices" is used to designate a variety of devices including, and not limited to mobile telephones, portable computers, stationary computers, portable handsets, to name only a few. The term "primary devices" or "incumbent devices" is used to designate devices operated by licensed users, and the term "secondary devices" or "cognitive radio" is used to designate devices operated by un-licensed users. Similarly, the terms "primary services" and "incumbent services" are used interchangeably to designate services operated by licensed users, while "secondary services" is used to designate services operated by un-licensed services. The term "free channel" or "white space channel" is used here to designate a channel that is not currently in use by a primary service or primary device.

Familiarity with television broadcasting, receivers, networking and encoding is assumed and is not described in detail herein. For example, familiarity with current and proposed recommendations for TV standards, such as ATSC, and networking standards, such as IEEE 802.16, 802.11h, and 802.22, is assumed. Further information on ATSC broadcast signals can be found in the following ATSC standards: *Digital Television Standard (A/53), Revision C, including Amendment No. 1 and Corrigendum No. 1*, Doc. A/53C; and *Recommended Practice: Guide to the Use of the ATSC Digital Television Standard* (A/54). Likewise, familiarity with applicable transmission standards, such as orthogonal frequency division multiplexing (OFDM) and orthogonal frequency division multiple access (OFDMA), is assumed.

Figure 1:
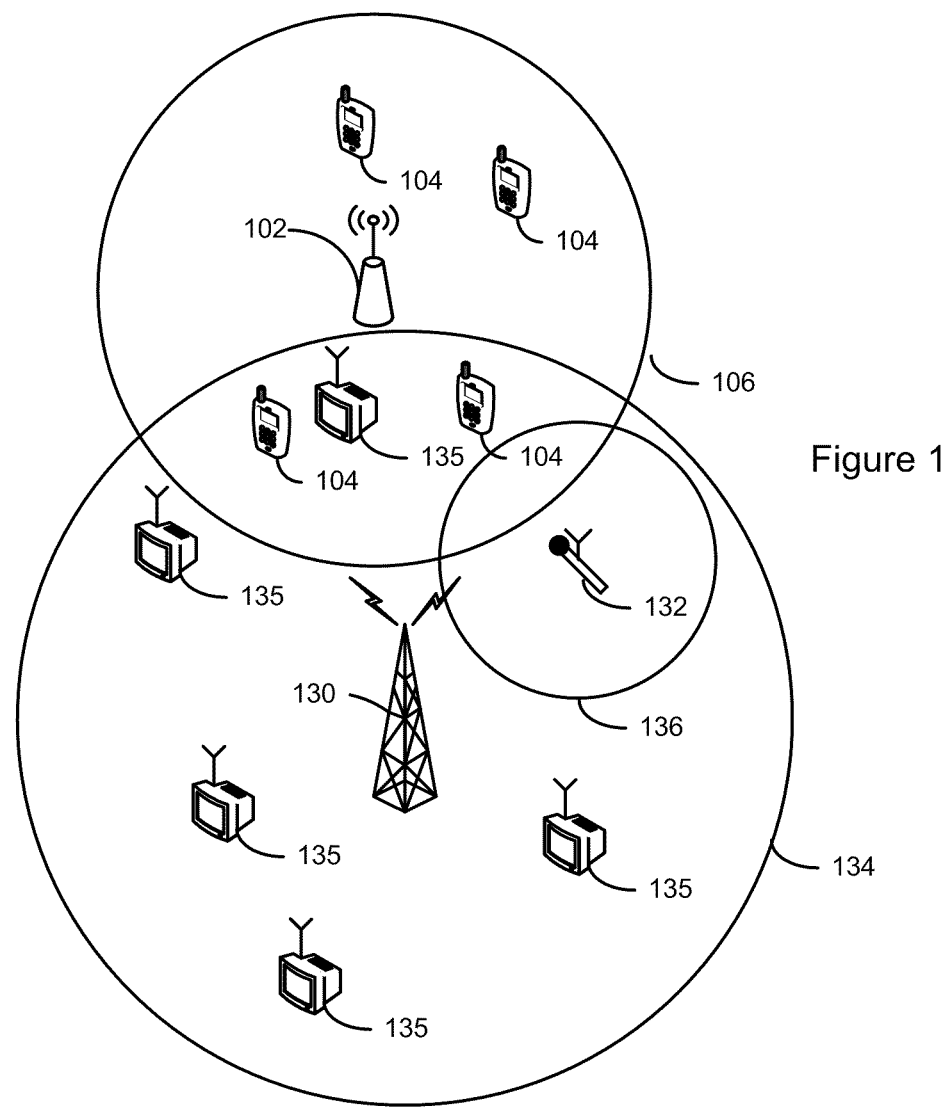
FIG. 1 is a block diagram of a wireless system.

An embodiment of a Wireless Regional Area Network (WRAN) operating in an environment also occupied by a primary service, such as a TV service, is shown in FIG. 1. The WRAN includes at least one Base Transceiver Station (BTS), wireless access point or base station (BS) 102, and a plurality of secondary wireless devices 104 communicating with the BS 102. Each of BS 102 and secondary wireless devices 104 includes receiver and transmitter functions, such as implemented by transceivers 204 and 206 (shown in FIGS. 2A and 2B). Similarly, secondary wireless devices 104 can be implemented as mobile stations, active terminals, mobile terminals, mobile transceivers, or other suitable wireless devices. The secondary wireless devices 104 can also be fixed devices, such as customer premise equipment (CPE) located at a customer premise. BS 102 serves a radio coverage area as indicated generally by the area 106. The BS 102 and secondary wireless devices 104 can, for example, transmit OFDM signals comprising 2048 subcarriers in a channel. The 2048 subcarriers are divided into 16 subcarrier sets, or subchannels, each subcarrier set comprising 128 subcarriers.

The WRAN operates in an environment that includes primary services such as television service provided by TV tower 130, or a venue in which a wireless microphone 132 is operating. The TV tower 130 has a coverage area generally indicated by the area 134 and transmits to television sets 135 within the coverage area. The standard TV spectrum provides 69 TV channels in the very high frequency (VHF) and ultra high frequency (UHF) bands. Each TV channel, or band, occupies 6 MHz of bandwidth. The wireless microphone 132 transmits within an area generally indicated by the area 136 and also transmits in the TV spectrum, thought it may only be transmitting on a portion of a channel. A WRAN system makes use of unused channels, or portions thereof, in the TV spectrum. In this regard, the WRAN system must perform "channel sensing" or "spectrum sensing" to determine which of the channels, or portions of channels, are active in the WRAN area in order to determine that portion of the TV spectrum that is actually available for use by the WRAN system.

Figure 2A:
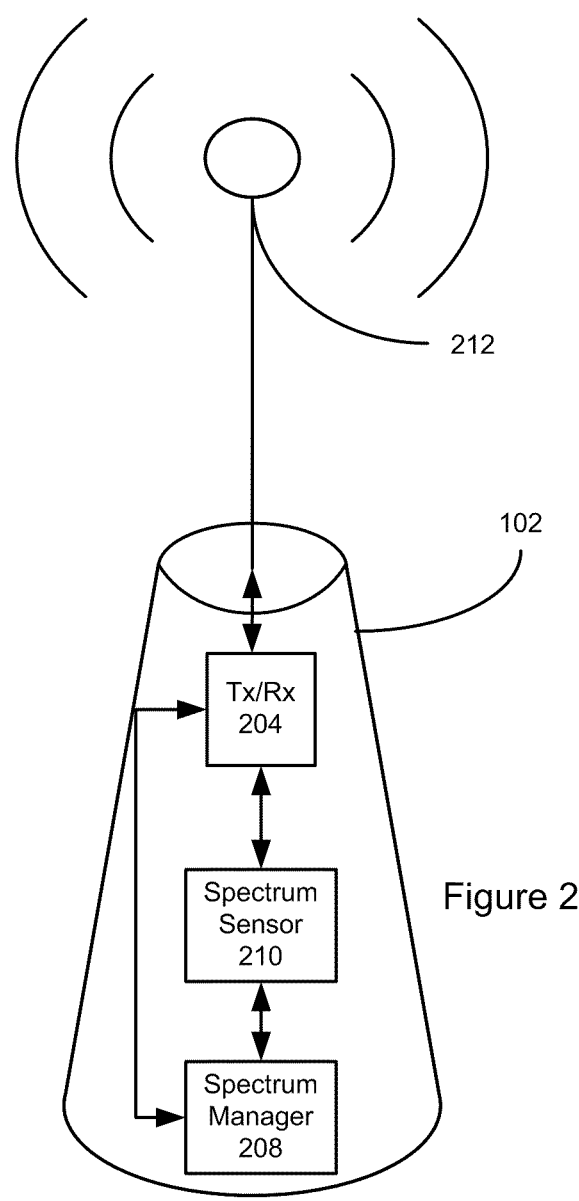
FIG. 2A is a block diagram of a base station.
Figures 2B, 7:
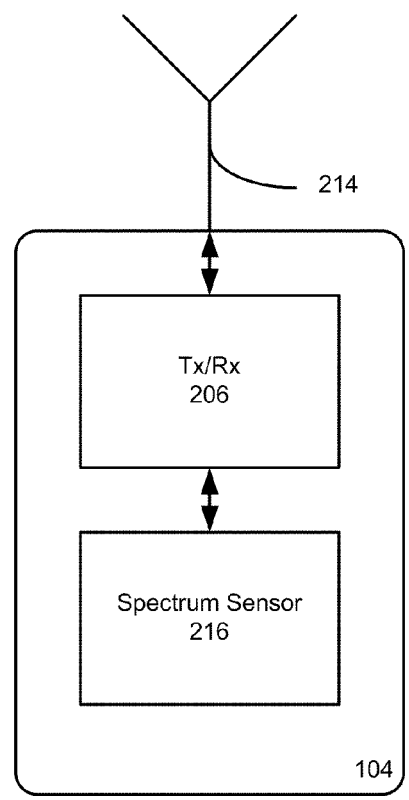
FIG. 2B is a block diagram of a secondary wireless device.
FIG. 7 is a diagram of a WiFi frame.

The availability of channels for occupation by the secondary devices 104 changes over time. The secondary devices 104 beneficially obtain channel availability in a dynamic manner. Thus, as primary devices start and finish transmission on a certain channel, the channel becomes unavailable and available, respectively, for occupation by the secondary devices. FIGS. 2A and 2B illustrate elements of the BS 102 and a secondary wireless device 104 used to perform the necessary spectrum sensing according to the present invention. In order to protect the primary devices and provide service to the secondary devices, a spectrum manager module 208 in the BS 102 is provided to dynamically assign the free channels to secondary devices contending for service on the TV channels. The spectrum manager 208 collects information related to channel availability and information regarding the secondary devices 104. This information can be provided through central databases (not shown) with which the BS 102 communicates, through dynamic reporting from the secondary wireless devices 104, and through dynamic sensing by the BS 102. A spectrum sensor module 210 in the BS 102 provides the spectrum sensing capabilities, and communicates with the spectrum manager 208. Spectrum sensing and communication with the secondary wireless devices 104 is performed in conjunction with the transceiver 204 and the antenna 212.

Each secondary wireless device 104 is also provided with a physical interface, including a transceiver 206 and an antenna 214. A spectrum sensor module 216 communicates with transceiver 206 to perform spectrum sensing, as further described below.

As will be appreciated, the BS 102 and each secondary wireless device 104 is a processor-based device and includes one, or more, processors and associated memory. In this context, computer programs, or software, are stored in memory for execution by the processor. The processors may be any suitable stored-program control processors, and the memory can be any suitable storage device (volatile and/or non-volatile), such as random-access memory (RAM) or read-only memory (ROM), which can be internal and/or external to the BS 102 or secondary wireless device 104, and can be as necessary. Embodiments of the method and other programmable components can be represented as a software product stored in the memory (also referred to as a computer-readable medium, a processor-readable medium, or a computer usable medium having a computer-readable program code embodied therein). Software running from on the processor can interface with circuitry to perform the described tasks.

Figure 3A:
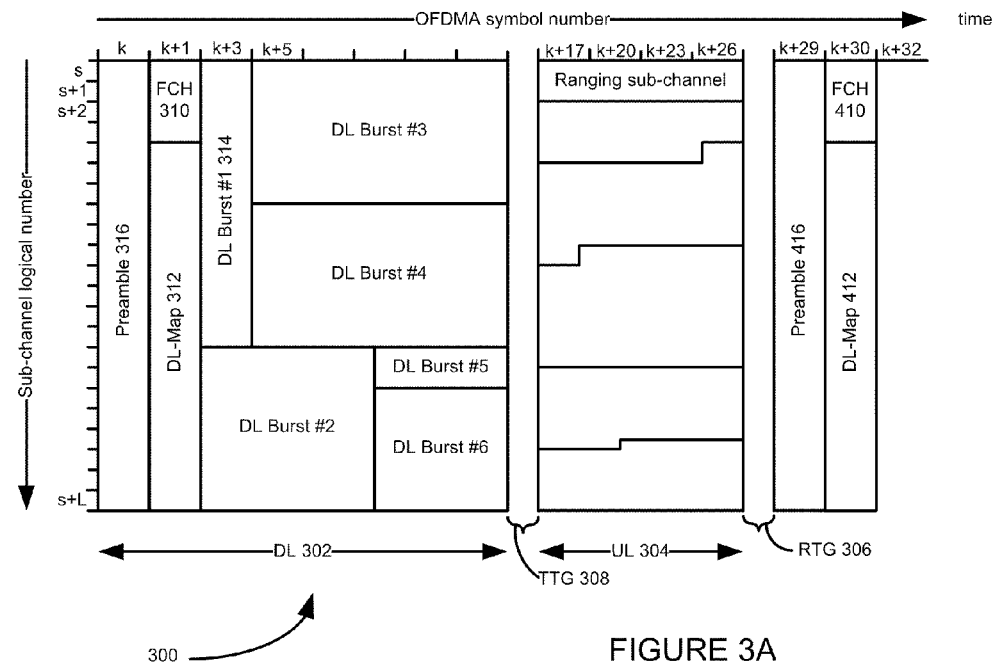
FIG. 3A is a diagram of an OFDMA frame used in a wireless system.

The physical layer of communication between BS 102 and secondary wireless device 104, via antennas 212 and 214, is for the purposes of illustration OFDM-based. An illustrative frame 300 for use in communicating information between BS 102 and secondary wireless device 104 is shown in FIG. 3A. Frame 300 is similar to an OFDMA frame as described in IEEE 802.16-2004, "IEEE Standard for Local and metropolitan area networks, Part 16: Air Interface for Fixed Broadband Wireless Access Systems". Frame 300 is representative of a time division duplex (TDD) system in which the same frequency band is used for uplink (UL) and downlink (DL) transmission. As used herein, uplink refers to communications from secondary wireless device 104 to BS 102, while downlink refers to communications from BS 102 to secondary wireless device 104. Each frame comprises two subframes, a DL subframe 302 and a UL subframe 304. In each frame, time intervals are included to enable BS 102 to switch from receive to transmit mode and vice-versa. During this intervals, the BS 102 is not transmitting modulated data but is simply allowing the BS transmitter carrier to ramp up, and the transmit/receive (Tx/Rx) antenna switch to actuate. The intervals are shown in FIG. 3 as an RTG (receive/transmit transition gap) interval 306 and a TTG (transmit/receive transition gap) interval 308. Each subframe conveys data in a number of bursts. Information about the frame and the number of DL bursts in the DL subframe and the number of UL bursts in the UL subframe is conveyed in frame control header (FCH) 310, DL MAP 312 and UL MAP 314. Each frame also includes a preamble 316, which provides frame synchronization and equalization. The downlink preamble 316 is generally used in wireless systems for physical-layer functionality, such as time and frequency synchronization and initial channel estimation. The preamble has one of 128 patterns and the neighboring cells have different preambles so that the terminals can to distinguish the cells and sectors from others.

To enter a WRAN network, secondary wireless device 104 first attempts to associate with BS 102. During this attempt, secondary wireless device 104 transmits information, via transceiver 206, on its capabilities to BS 102 via a control channel (not shown). The reported capabilities include, e.g., minimum and maximum transmission power, and a supported channel list for transmitting and receiving. In this regard, secondary wireless device 104 performs channel sensing, through its spectrum sensor 216, to determine which TV channels are currently available in the WRAN area. The resulting available channel list for use in WRAN communications is then provided to BS 102. The spectrum manager 208 of BS 102 uses the reported information to decide whether to allow secondary wireless device 104 to associate with it.

Once communication between the BS 102 and a secondary wireless device 104 is established, the secondary wireless device 104 must perform periodic spectrum sensing, using its spectrum sensor 216, to determine if a primary service has started to transmit on the channel on which it is communicating, and to locate free channels for continuing communication with the BS 102. This information is dynamically reported to the spectrum manager 208 of BS 102. The BS 102 can also perform such periodic spectrum sensing, and provide information concerning occupied and free channels to the spectrum manager 208. A method for performing this periodic spectrum scanning, which does not require the use of quiet periods, will now be described with reference to the flowchart of FIG. 4, and FIGS. 1-3. The method will be described from the perspective of a secondary wireless device 104, but can be equally implemented in the BS 102.

The method involves extending the transition periods, such as the RTG 306 and TTG 308 described above, and scanning the spectrum during the extended transition periods. The transition period can be extended by a specified amount that is programmed into the transmitting and receiving devices (e.g. BS 102 and secondary wireless devices 104), or is communicated in a message sent to the receiving device. The message can be sent over a control channel, or on the current channel over which the devices are communicating, and can be sent at initialization, when the devices associate, or during periods of regular data transmission, and may be included in header or other control data sent with each frame. The amount by which any transition period is extended is a matter of design choice, but an extension of the transition period to approximately 5ms is expected to provide sufficient time to perform spectrum scanning operations. The length of the extended transition period need not be fixed, and can be adapted on the fly or at periodic intervals. It is also not necessary to extend all transition periods. Selected transition periods, or specified transition periods, at certain predetermined spaced intervals, can be extended as desired.

Figure 3B:
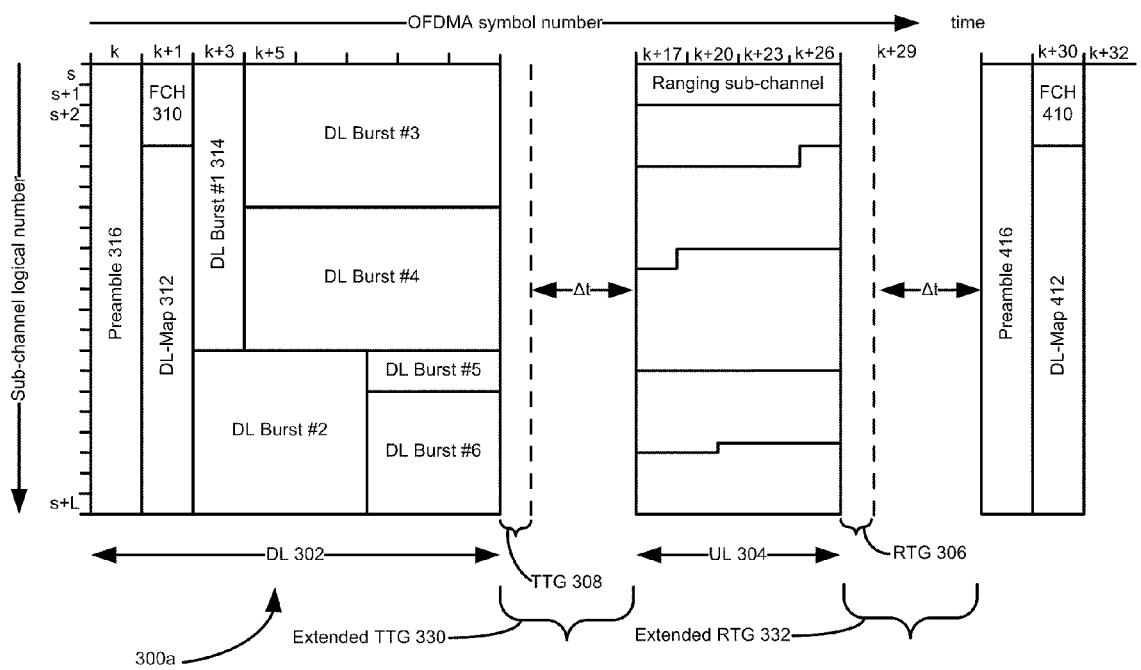
FIG. 3B is a diagram of an OFDMA frame having extended transition periods.
Figure 4:
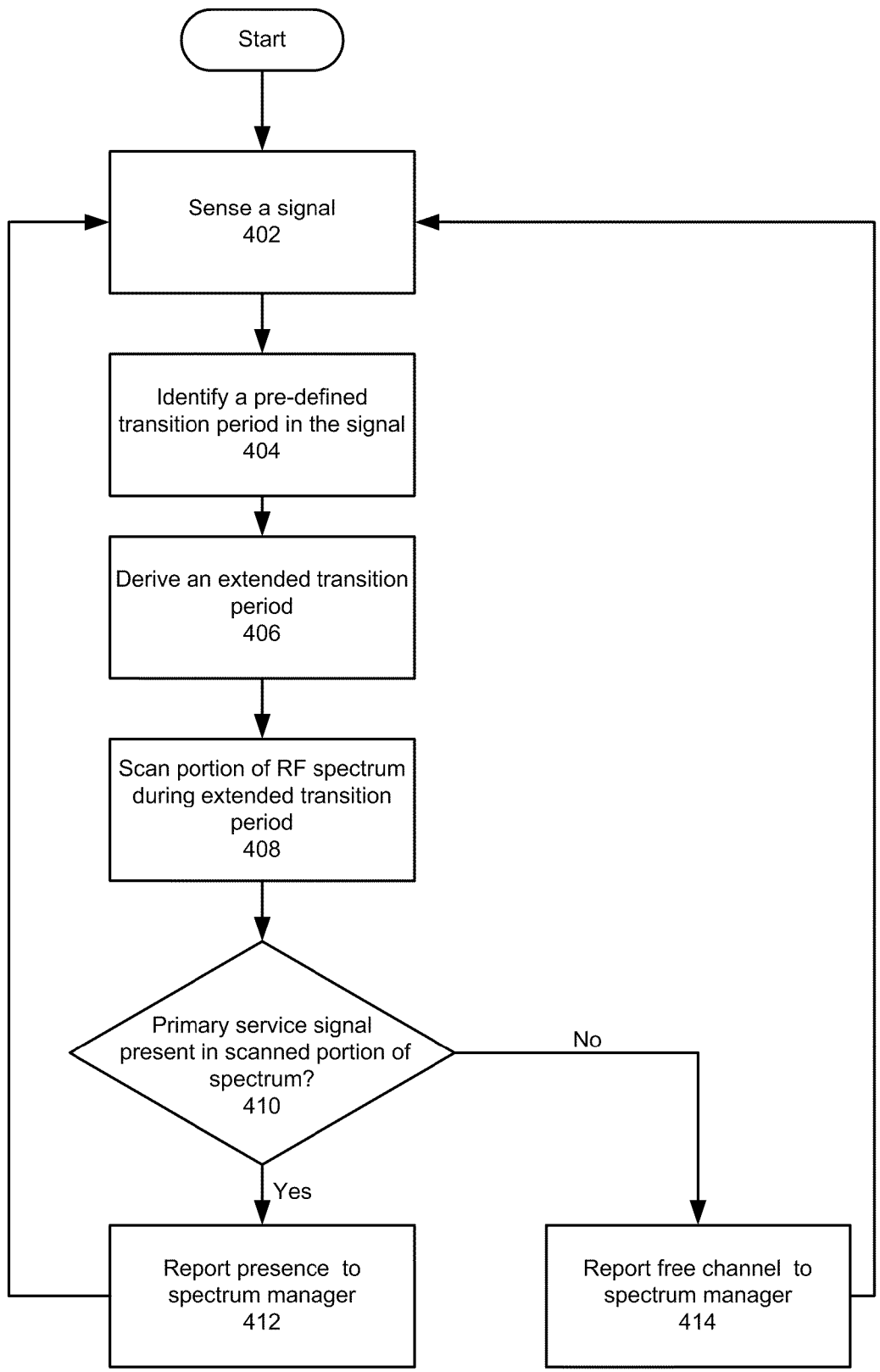
FIG. 4 is a flowchart of a method for spectrum sensing using extended transition periods

Extended transition periods are illustrated in FIG. 3B in relation to the OFDMA frame structure of FIG. 3A. In frame 300a, the TTG 308 has been extended by an amount Δt to result in the extended TTG 330. A similar extension has been applied to RTG 306, resulting in the extended RTG 332.

The method begins with the secondary wireless device sensing a signal (step 402). The signal can, for example, by an OFDMA signal originating at the BS 102. The spectrum sensor 216, or other receiver component, then identifies a pre-defined transition period in the signal (step 404), such as the RTG or the TTG. The TTG or the RTG can be identified by, for example detecting the beginning of the frame 300*a* and determining where the TTG 330 or RTG 332 begins based on the length of other pre-defined frame portions, such as the downlink or uplink bursts portions 302 and 304. At step 406, the spectrum sensor 216 derives the extended transition period to determine the end of the transition period in the received frame. As described above, the amount by which the transition period has been extended can be pre-programmed, or communicated by an appropriate message sent separately, or contained within the control information in the received frame.

Once the extended transition period is derived, spectrum scanning is performed during the extended TTG 330 or RTG 332 (step 408) to identify the presence of a primary service transmitting on the channel, or to identify a free channel (step 410). For example, to scan the spectrum and sense an incumbent service signal, transceiver 206 can be tuned to different ones of the channels by spectrum sensor 216 to select particular TV channels. For each selected channel, an input signal may be present. The input signal may represent an incumbent wideband signal such as a digital VSB modulated signal in accordance with the above-mentioned "ATSC Digital Television Standard", or an incumbent narrowband signal, such as is transmitted by a wireless microphone. If there is an primary service signal in the selected channel, spectrum sensor 216 then reports the information to spectrum manager 208 (step 412). Similarly, if no primary service signal is detected in the scanned channel, spectrum sensor 216 identifies the scanned channel as a free channel, the existence of the free channel can also be reported to the BS 102 (step 414).

It is also noted that scanning for white space can be performed with a bandwidth granularity depending on the bandwidth necessary for the respective secondary service. If a primary service is determined to be present in the scanned portion of the channel frequency range, another channel frequency range can be scanned during a following extended transition period.

Figure 5:
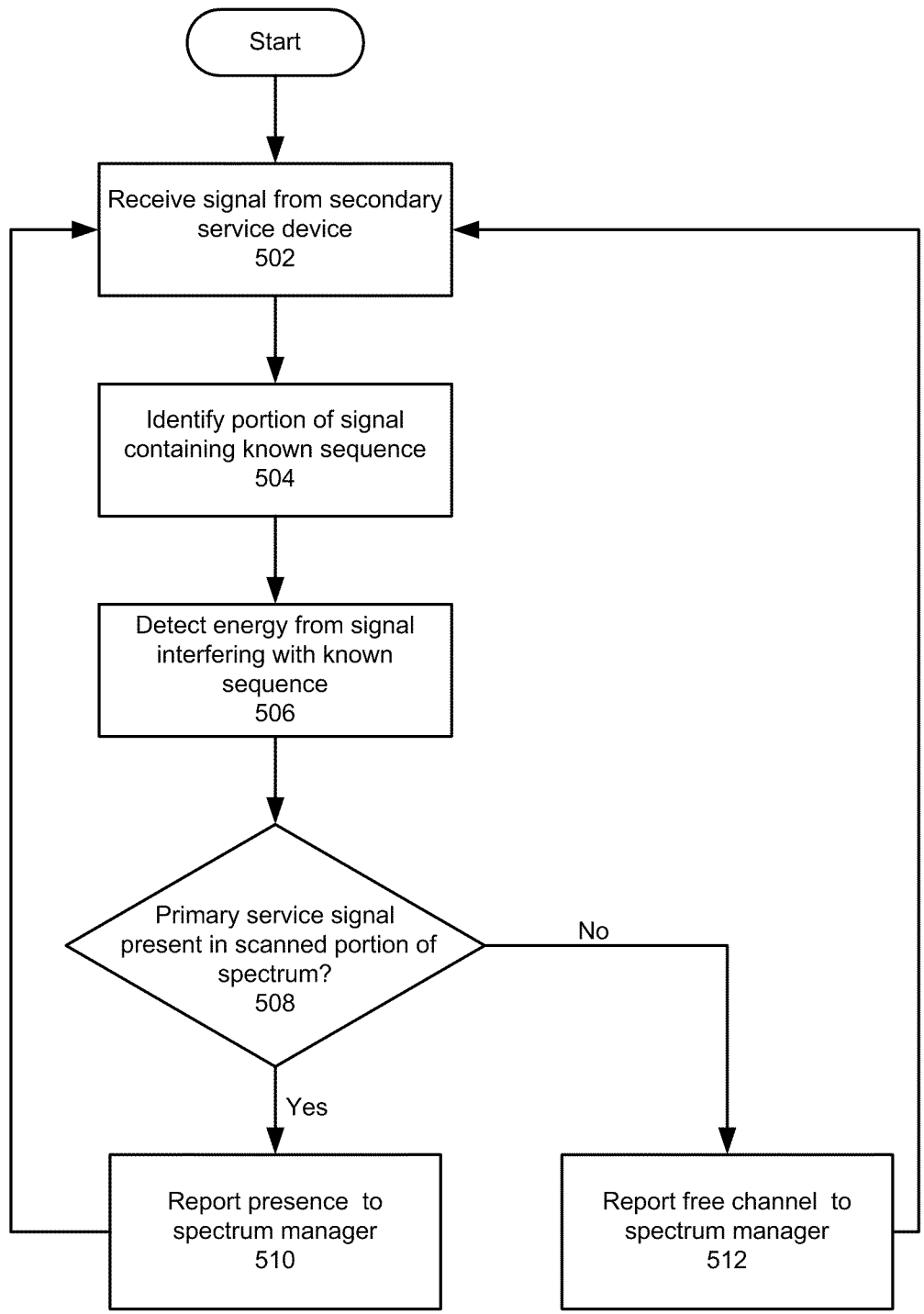
FIG. 5 is a flowchart of a method for spectrum sensing using known sequences.

In a further method for spectrum scanning without requiring quiet periods, a known sequence can be analyzed to determine if energy from a primary service signal is present, thus indicating the primary service is transmitting on the current channel. With reference to the flowchart of FIG. 5, a signal is sensed (step 502) by spectrum sensor 216. An a priori known sequence, such as preamble 316 of frame 300 or other well-known sequence that is typically transmitted with the data, such as a sequence of pilot signals, is then identified in a portion of the sensed signal (step 504). The preamble 316 is identified in the received signal using conventional techniques, such as at frame synchronization. Presence of a primary service transmitting on the channel is determined (step 508) by detecting energy from a primary service signal in the known sequence (step 506). If presence is detected, the presence of the primary service on the channel is reported to the spectrum manager 208 (step 510). If no primary service signal is detected, the existence of a free channel can be reported to the spectrum manager 208 (step 512). The method can be repeated periodically, such as on receipt of each frame, or as desired or required by applicable standards.

Figure 6:
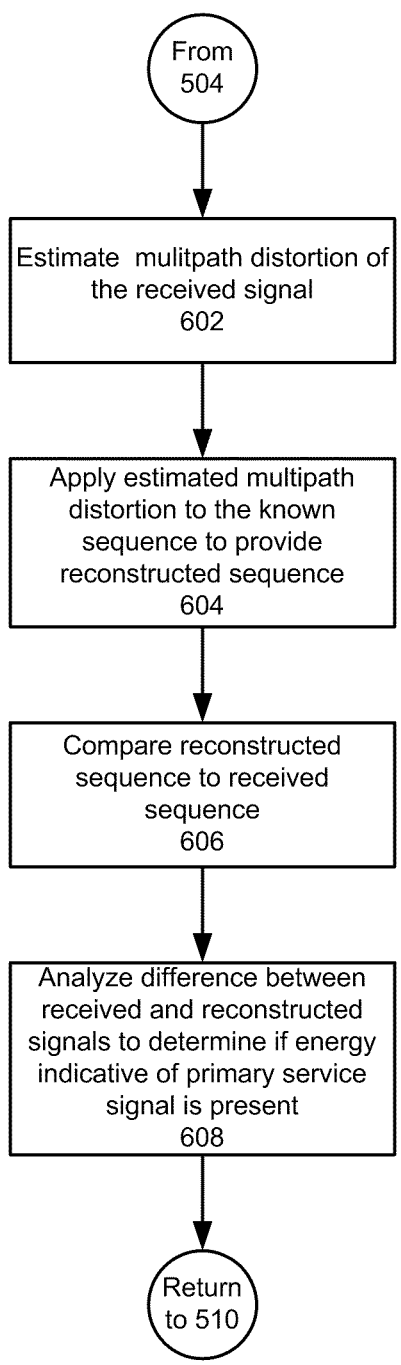
FIG. 6 is a flowchart of a method for detecting energy from a primary service signal in a known sequence.

As shown in the flowchart of FIG. 6, one method for detecting the presence of the primary service on the channel can be achieved by estimating the multipath distortion of the received signal (step 602). Mathematical models for determining multipath distortion are known, and generally use the impulse response in linear systems. In the case where the preamble is used as the known sequence, the controller 226 first senses the preamble, or the known sequence transmitted by the BS 102. FIG. 7 shows an example of a WiFi packet 700 for illustrating this embodiment of the invention. As is known, WiFi systems are packet-based systems where each packet includes a preamble 702 and data 704. The preamble 702 includes a plurality of repetitive short training sequences (STS) 706 followed by a guard interval (GI) 708, which is followed by a plurality of long training sequences (LTS) 710. The sequences of STS 706, GI 708 and LTS 710 are fixed and known. For example, once the receiver 208 synchronizes on the packet, it receives the known sequence (STSs, LTSs or both STSs and LTSs) and estimates the distortions caused by the multipath.

The sequence is then reconstructed by applying the estimated multipath distortion to the known sequence (step 604), and the resultant reconstructed sequence is compared to the received sequence (step 606). The difference between the reconstructed sequence and the received sequence is analyzed to determine if energy indicative of the primary service signal is present (step 608). If there is no primary service in that part of the spectrum, the difference signal will not have any energy in the part otherwise occupied by the preamble, other than an expected Gaussian noise contribution. In this case, the secondary device may use, or continue to use, the free channel. On the other hand, if the difference signal has a measurable amount of energy in the part otherwise occupied by the preamble, then a primary service is present in that part of the spectrum.

In some embodiments the invention provides an advantageous method of detecting portions of spectrum being used, or not used, at a certain time without using defined quiet periods of during which all secondary devices must perform spectrum scanning, thus saving essential resources. In addition, in certain embodiments the invention is accomplished with minimal changes to the existing equipment, resulting in cost savings.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable hardware device, discrete gate or transistor logic, discrete hardware components, or any combination thereof designed to perform the functions described herein. A general-purpose processor can be a microprocessor, but in the alternative, the processor can be any other hardware processor, controller, or microcontroller. A processor can also be implemented as a combination of computing devices, for example, a combination of a DSP and a microprocessor, a plurality of microprocessors, one or more microprocessors in conjunction with a DSP core.

The steps of a method or algorithm and the functionality of a block or module described in connection with the embodiments disclosed herein can be embodied directly in hardware, in a software module executed by a processor, or in a combination of the two. A software module can reside in the computer or processor accessible or readable storage media including RAM memory, flash memory, ROM memory, EPROM memory, EEPROM memory, registers, hard disk, a removable disk, a CD-ROM, or other form of storage medium such as a computer readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A method of radio frequency (RF) spectrum scanning for wireless communications to determine whether a channel is being used by a primary service or is available for use, comprising:
    sensing a signal transmitted in a channel defined within the RF spectrum;
    identifying a portion of the signal containing a known sequence; and
    determining the presence of a primary service on the channel, to determine whether the channel is available for use, by
        estimating multipath distortion in the signal,
        reconstructing a reconstructed sequence by applying the estimated multipath distortion to the known sequence,
        determining the difference between the reconstructed sequence and the identified portion of the signal containing the known sequence, and
        determining that energy indicative of the primary service signal is present in the difference.

2. The method of claim 1 further comprising reporting the presence of the primary service on the channel.

3. The method of claim 1 wherein determining that energy indicative of the primary service signal is present in the difference comprises determining that energy in excess of an expected noise contribution is present in the difference.

4. The method of claim 1 wherein identifying the portion of the received signal containing the known sequence comprises identifying a preamble of a frame.

5. The method of claim 4 wherein the preamble is identified at frame synchronization.

6. The method of claim 4 wherein the frame is an Orthogonal Frequency Division Multiple Access (OFDMA) frame.

\* \* \* \* \*